United States Patent [19]
Jimenez

[11] 3,818,615
[45] June 25, 1974

[54] EDUCATIONAL PUZZLE WITH PAPER WRITING SURFACE

[76] Inventor: David J. Jimenez, P.O. Box 3458 Station "A", El Paso, Tex. 79923

[22] Filed: July 16, 1973

[21] Appl. No.: 379,244

Related U.S. Application Data

[63] Continuation-in-part of Ser. No. 288,339, Sept. 12, 1972, Pat. No. 3,745,675.

[52] U.S. Cl. .................................. 35/37, 35/73
[51] Int. Cl. ................................ G09b 11/04
[58] Field of Search...... 35/8 R, 9 R, 9 D, 28, 31 D, 35/31 F, 31 G, 35 H, 35 J, 37, 38, 36, 69, 70, 71, 72, 73; 273/153 R, 156, 157 R

[56] References Cited
UNITED STATES PATENTS

| | | | |
|---|---|---|---|
| 163,912 | 6/1875 | Birmeli | 35/71 |
| 1,085,405 | 1/1914 | Dadd | 35/73 X |
| 1,171,078 | 2/1916 | Wirt | 281/6 |
| 2,225,025 | 12/1940 | Weingott et al. | 281/6 |
| 2,310,800 | 2/1943 | Manhart | 35/69 X |
| 2,327,059 | 8/1943 | Pal | 35/28 X |
| 2,566,989 | 9/1951 | Lathrop | 281/6 |
| 2,711,595 | 6/1955 | Sharp | 35/35 H |
| 2,725,244 | 11/1955 | Friday | 281/6 |
| 3,380,176 | 4/1968 | Kling et al. | 35/73 X |
| 3,618,956 | 11/1971 | Biederer | 273/157 R |
| 3,731,402 | 5/1973 | Paul | 35/37 |
| 3,740,872 | 6/1973 | Mayo | 35/37 |
| 3,745,675 | 7/1973 | Jimenez | 35/73 |

Primary Examiner—Wm. H. Grieb
Attorney, Agent, or Firm—Clarence A. O'Brien; Harvey B. Jacobson

[57] ABSTRACT

An educational puzzle for teaching recognition of letter and number symbols and providing a paper writing surface by which a child may form letters, number symbols and the like. The puzzle includes a box-like device provided with a mounting and writing surface on the front thereof which is framed on two sides by a raised, three-dimensional figure of a clown or the like together with inserts shaped in the form of letter or number symbols and adapted to fit on the mounting surface together with a paper roll dispensing arrangement or paper insert also associated with the mounting surface by which a child may write.

3 Claims, 3 Drawing Figures

PATENTED JUN 25 1974 3,818,615

EDUCATIONAL PUZZLE WITH PAPER WRITING SURFACE

CROSS REFERENCE TO RELATED APPLICATION

This application is a continuation-in-part of my copending application Ser. No. 288,339, filed Sept. 12, 1972 for Educational Puzzle now U.S. Pat. No. 3,745,675, issued July 17, 1973.

BACKGROUND OF THE INVENTION

1. Field of the Invention

The present invention generally relates to puzzles and educational devices and more particularly to devices for use in recognition and association of letters, number symbols or the like and also includes structure to enable a paper writing surface to be positioned for use by children to aid them in learning and forming letter and number symbols.

2. Description of the Prior Art

The prior patents of record in the copending U.S. application Ser. No. 288,339 disclose educational apparatuses generally in the nature of puzzles that include symbols, such as alphabetical letters, associated with a recess for positioning letters in a particular pattern for educational purposes. Additional prior U.S. Pat. Nos. 163,912, issued June 1, 1875; 3,380,176, issued Apr. 30, 1968; 2,566,989, issued Sept. 4, 1951; 2,725,244, issued Nov. 29, 1959; 1,171,078, issued Feb. 8, 1916; 2,225,025, issued Dec. 17, 1940; 3,618,956, issued Nov. 9, 1971 relate generally to educational and puzzle devices with several of the patents also including paper dispensing devices. However, while educational devices and puzzles have a certain degree of attraction for children, the combination of a facility on which a child may actually perform such as by writing, is not employed in the prior art.

SUMMARY OF THE INVENTION

An object of the present invention is to provide an educational device in the form of a puzzle utilizing a recess for receiving inserts and facility for providing a paper surface on which a student may write thus leaving the student with a tangible record of his achievement and success.

A further object of the invention is to provide an educational device in the form of a puzzle by which small children may become familiar with abstract letter and number symbols, the placing and fitting of inserts into a recess in their correct position and the provision of a stencil or guide by which letters or symbols may be formed on a writing surface.

Still another object of the invention is to provide an educational device in which the mounting recess includes a partially complete image or figure such as a clown with the inserts, when properly placed, forming a completion of the image thus training the child in manipulation and positioning of inserts and rewarding him with the complete image or picture when the insert is properly positioned.

Yet another important object of the invention is to provide an educational puzzle which not only facilitates the teaching of various facts relating to letters, numbers or other symbols but also teaches manual dexterity, matching of shapes and is otherwise highly intriguing to children thus retaining their attention for extended periods of time which facilitates the learning process.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
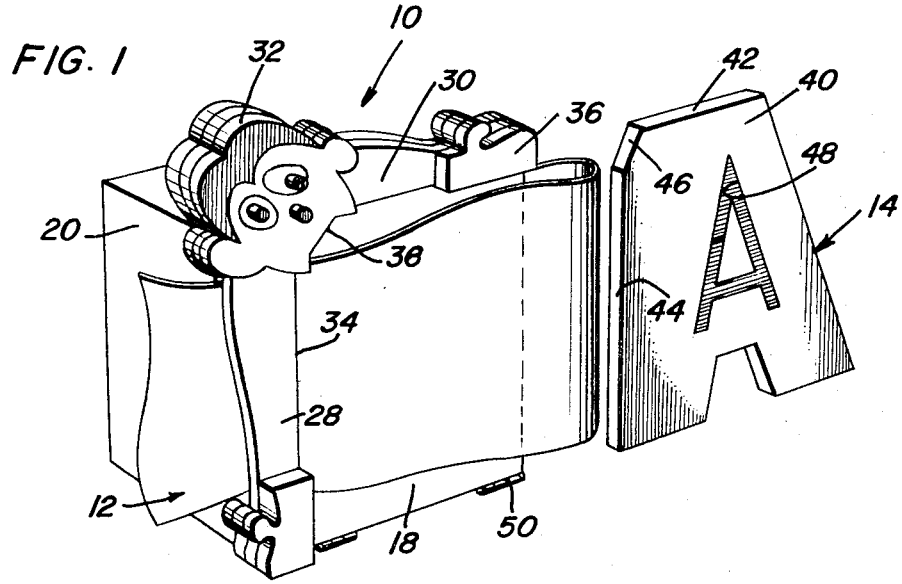
FIG. 1 is an exploded perspective view of the educational puzzle of the present invention illustrating the letter insert and paper dispensing arrangement.
Figure 2:
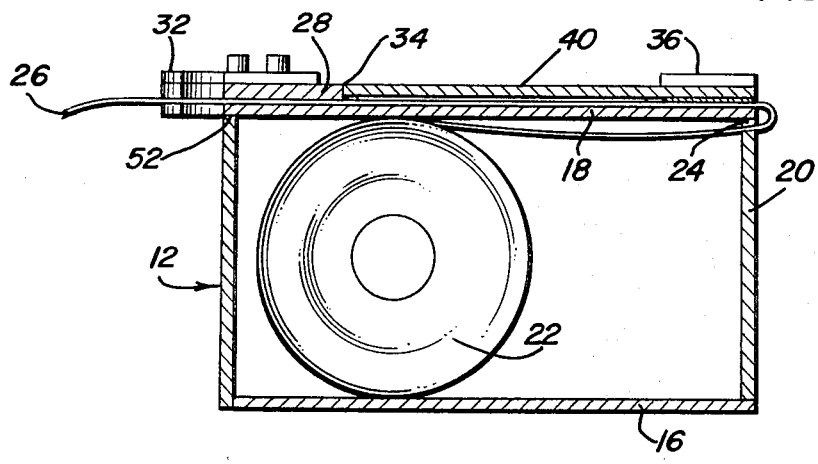
FIG. 2 is a sectional view of the structure of FIG. 1.

Referring now to the drawings, the educational puzzle device of the present invention is generally designated by reference numeral 10 and includes a receptacle or box 12 and a plurality of inserts 14. The box 12 includes a rear wall 16 and a front wall 18 joined by peripheral walls 20 which define substantially a square or rectangular box defining a hollow interior in which is received a roll of paper 22 of indeterminate length and of a width substantially the same as the height of the box. The paper may be in the form of that normally employed in recording transactions on cash registers, adding machines and the like. The paper 22 which may be in the form of a paper strip or web extends out through a slot-like recess or notch 24 formed in the right side wall of the box 12 and then extends along and in overlying relation to the front wall 18 as illustrated in FIGS. 1 and 2 with the free end 26 of the paper web or strip 22 extending laterally beyond the left side edge of the box 12.

The front wall 18 of the box 12 defines a mounting base for the inserts 14 and is of generally rectangular or square configuration which is bordered on two sides by arms 28 and 30 which are associated with a comical face or head 32 which may be in the form of a clown's head. As illustrated, the arms 28 and 30 are perpendicular to each other and have straight inner edges 34 which define a portion of the recess overlying the front wall 18. Also, the arms 28 and 30 are of a double thickness of material, that is, one thickness corresponding with the front wall 18 in thickness and forming a projection therefrom and another thickness disposed forwardly of the front wall 18 with the thickness thereof being generally the same as the insert 14. The head 32 has a third thickness and also the ends of the arms have a third thickness defining hands 36 thereby providing an effective three-dimensional effect for the clown configuration. At the juncture of the straight inside surfaces 34, the arms and the inner corner of the head 32 is provided with a diagonal surface 38 which forms a portion of the clown's face.

The insert 14 includes a panel 40 of generally rectangular configuration including a top edge surface 42 and a side edge surface 44 in perpendicular relation to each other for engaging the perpendicular surfaces 34. The inner and upper corner of the panel 40 is provided with a diagonal cut 46 to correspond with and engage the diagonal surface 38 between the edges 34 of the arms 28 and 30 so that the panel 40 will abut and engage the inner portion of the clown's face thus forming a continuation and completion of the configuration of the clown's face. Also, the panel 40 is provided with a letter, numeral or other symbol 48 thereon which may be formed in any suitable manner and the entire panel may be shaped in a similar manner, that is, the panel 40 may be in the shape of the letter or symbol 48. The structure of the insert and its association with the clown face is substantially the same as that disclosed in my copending application except that the diagonal surfaces 38 and 46 have been used rather than the arcuate surfaces as disclosed in my copending application and the association of the inserts in relation to the mounting recess and clown's face and arms is the same as that disclosed in my copending application.

The front wall 18 may be hingedly secured in place such as by hinges 50 or it may be slidably removable to enable replacement of the paper roll 22 when exhausted. Also, the arm 28 is spaced slightly away from the front wall 18 throughout substantially its entire length to provide a slot 52 through which the free end portion 26 of the paper web is threaded with the outer edge of the arm 28 defining a tear edge so that the paper may be pulled through the slot 52 and torn off by pulling upwardly on the free end of the paper web with one hand while holding the box and paper downwardly against the front surface of the front wall 18 with the other hand thereby enabling the paper which has been written upon to be torn off and retained by the person using the device.

As illustrated in FIG. 2, the insert 14 overlies the mounting recess defined by the front surface of the front wall 18 and the arms 28 and 30 and also overlies the paper 22. This enables the letter or symbol 48 to be in the form of a stencil that is, with a slot cut through the insert so that a pencil may be used to form the letter or symbol on the underlying paper thus enabling the child to practice formation of letters or symbols so that the letters or other symbols that have been formed on the paper can subsequently be torn off and retained thereby providing the student with a record of his accomplishments.

Figure 3:
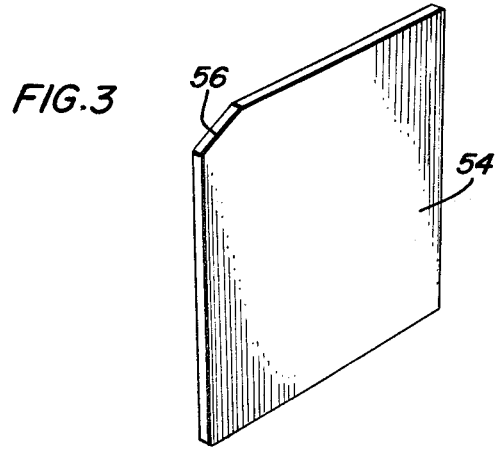
FIG. 3 is a perspective view of a blank paper insert that may be used in lieu of the paper roll.

FIG. 3 illustrates a paper insert 54 having a notch 56 corresponding to the notch 46 for use in lieu of the paper roll. The paper insert 54 is of the same shape and size as the mounting recess and will fit the mounting recess in generally the same manner as the paper web so that the paper insert may be written upon in the same manner as the paper web. In this arrangement, the box structure may be omitted and the educational device constructed in substantially the same manner as in the copending application. In use, the insert 54 is positioned on the mounting recess and provides a writing surface and may be used with or without the panel insert 14 having the letter or symbol stencils incorporated therein. The paper inserts 54 may be removed when the writing lesson has been completed or whenever desired and replaced with a clean paper insert. The paper inserts may be of conventional paper material or may be slightly thicker and stiffer than conventional paper material. All of the components may be decorative in nature and constructed of any suitable material such as plastics, wood, cardboard or the like and the figure of the clown or other image may be varied and the particular matching notch or cutout may also be varied and, of course, the letters and symbols may be varied as desired.

The device provides a visually incomplete figure or form which also serves as a mounting base or recess for the stencil insert and when the insert is manipulated into the correct position, the figure becomes complete and in this case the clown's mouth is completed and thus making the clown smile as a reward for successful work. The paper insert or paper roll is used to form letters by tracing through the stencil or as the learning process proceeds, the paper insert or paper roll may be used as a writing surface for free expression of the student. The educational puzzle is of great value in the training of preschool children as well as those with problems relating to letter and symbol formation or other mental deficiencies.

The foregoing is considered as illustrative only of the principles of the invention. Further, since numerous modifications and changes will readily occur to those skilled in the art, it is not desired to limit the invention to the axact construction and operation shown and described, and accordingly all suitable modifications and equivalents may be resorted to, falling within the scope of the invention.

What is claimed as new is as follows:

1. An educational puzzle comprising a mounting base, and at least one insert member corresponding to a letter or number symbol, said base including a generally rectangular mounting recess and a figure of a clown, or the like partially surrounding said recess and including a pair of arms raised above the recess and extending at generally right angles to each other, said figure including a partial face positioned at the junction of said arms, a portion of said face being immediately adjacent to said mounting recess, said insert member being removably positioned in said mounting recess and including a peripheral portion which cooperates with said partial face of said figure to complete such when the insert is properly positioned, and a paper member positioned in overlying relation to the recess on the mounting base to form a writing surface, said insert member being in the form of a stencil overlying the writing surface by which a letter, number symbol or the like may be formed on the writing surface of the paper.

2. The structure as set forth in claim 1 wherein said paper member is in the form of a paper insert corresponding in shape and configuration to the mounting recess.

3. The structure as defined in claim 1 wherein said paper member is in the form of a paper roll a portion extending over the mounting recess, said mounting base including a receptacle receiving the paper roll.

* * * * *